March 3, 1970  A. A. ASHTON ET AL  3,498,325
LOADING ARM AND QUICK RELEASE COUPLER
Filed Sept. 14, 1967  2 Sheets-Sheet 2
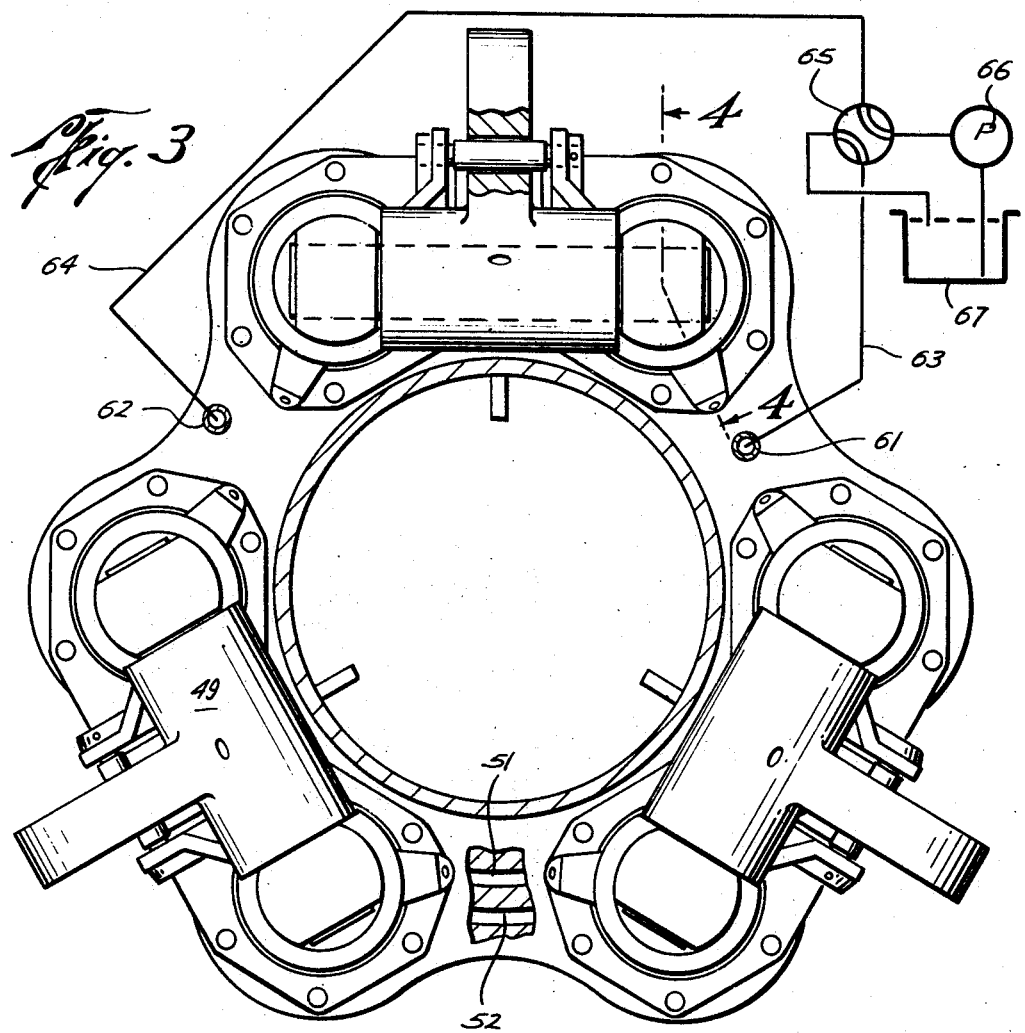
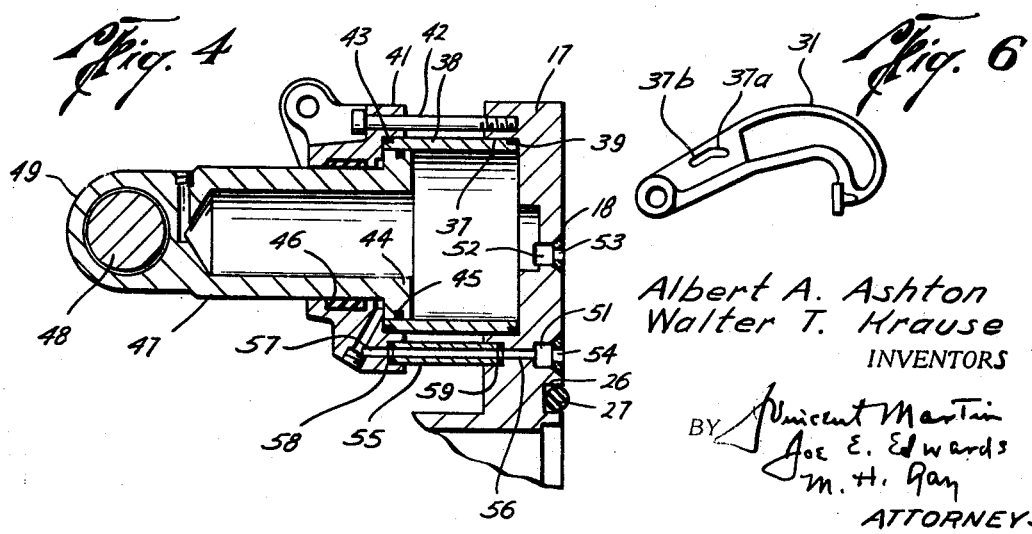
Albert A. Ashton
Walter T. Krause
INVENTORS
BY Vincent Martin
Joe E. Edwards
M. H. Gay
ATTORNEYS United States Patent Office 3,498,325
Patented Mar. 3, 1970

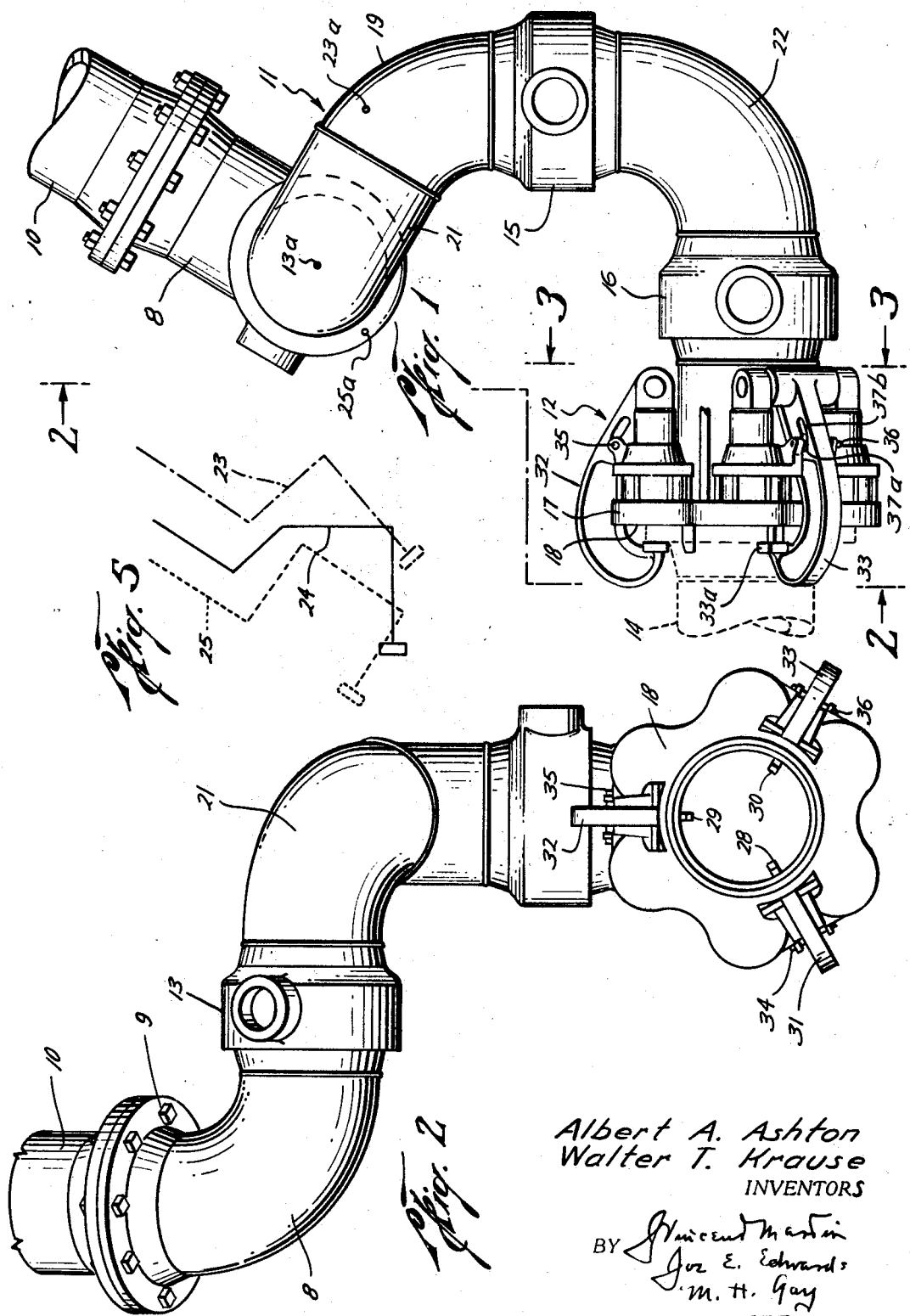

3,498,325
LOADING ARM AND QUICK RELEASE COUPLER
Albert A. Ashton, Dallas, and Walter T. Krause, Houston, Tex., assignors to The Youngstown Sheet and Tube Company, Boardman, Ohio, a corporation of Ohio
Filed Sept. 14, 1967, Ser. No. 667,716
Int. Cl. F16l 21/04; B63b 27/24
U.S. Cl. 137—615                                    5 Claims

ABSTRACT OF THE DISCLOSURE

This patent discloses a swivel system for connecting a loading arm to a ship's manifold and a hydraulically operated quick release coupling. The swivel system provides for rotation in three mutually perpendicular planes and holds the coupler face perpendicular, or slightly looking down, for quick coupling to the ship's manifold while at the same time reducing the moment arm of the load imposed upon the ship's manifold. The quick release coupler is hydraulically operated by a plurality of circumferentially arranged pistons and is of small size and light weight.

---

This invention relates to loading arms, and more particularly to the swivel assembly at the outboard end of a loading arm and the means for coupling the swivel assembly to a ship's manifold.

Modern loading arms for transferring fluid or fluidizable material are completely counterbalanced in all positions. See the patents to Mowell, No. 3,073,343, and Sorensen, No. 3,085,593. The arms are counterbalanced in empty condition, and as a result the ship's manifold must support a load imposed by the weight of the fluid in the arm. As the total length of the arms may be as much as 100 feet, or more, and the diameter of the arm as much as 16 inches, the load imposed on the ship's manifold due to the weight of petroleum products, or other materials, may be very substantial. For instance, the shear load may be in excess of 10,000 pounds and the bending force in excess of 30,000 foot pounds, depending upon the length of the moment arm through which the loads are applied.

The conventional swivel assembly at the outboard end of a loading arm hangs in position where the coupling flange looks downwardly at a considerable angle to the verticle. With large diameter loading arms the weight of the swivel assembly and coupling flange is many hundreds of pounds, and difficulty is experienced in securing the coupling flange to the ship's manifold.

It has been conventional in the past to use a common flange on the free end of the swivel assembly which is bolted to a flange on the ship. In the event of an emergency, such as the ship breaking free of its moorings, the loading arm must be quickly released from the ship's manifold. Obviously there is not time to remove a circle of bolts and nuts, and one solution in the past has been the use of a spool in the attachment system having a weekened section which will part. Obviously this is a tremendous strain on the loading arm structure, and undesirable.

It is also desirable to quickly release the coupling in the event of fire or other emergencies. Hydraulically operated couplers have been used in the past, but they have been so massive that their used is limited to coupling a single loading arm to a ship's manifold, or to those ships which have widely spaced manifold flanges. A large number of ships have closely spaced manifold flanges, and thus a massive coupler cannot be used. In addition, the pure weight of a massive coupler is objectionable on a fully counterbalanced arm as it increases the counterbalance load and this load, together with the mass of the coupler, increases the mass of the entire loading arm.

It is an object of this invention to provide a loading arm swivel assembly and quick release hydraulic coupler which solves the above discussed problems.

Another object is to minimize the effect of the uncounterweighted load of a loading arm and contents on a ship's manifold.

Another object is to provide a swivel assembly for a loading arm which has rotation in three mutually perpendicular planes in which the surface at the outboard end of the assembly which abuts the ship's manifold flange extends in a vertical plane, or looks down slightly, so that the abutting surface will always be facing the ship's manifold flange, or easily rotated to manifold-confronting position.

Another object is to provide for a loading arm, a quick release hydraulic coupler and a swivel assembly which is rotatable in three mutually perpendicular planes in which the annular surface of the hydraulic coupler which abuts the ship's manifold flange extends in a vertical plane or looks down slightly so that the annular surface will always be facing the ship's manifold, or be easily rotated to manifold-confronting position.

Another object is to provide for a loading arm, a quick release hydraulic coupler and a swivel assembly which is rotatable in three mutually perpendicular planes in which the annular surface of the hydraulic coupler which abuts the ship's manifold flange extends in a vertical plane or looks down slightly so that the annular surface will always be facing the ship's manifold, or be easily rotated to manifold-confronting position, and in which the vertical component of force resulting from the uncounterweighted load in the loading arm is applied through a minimum moment arm.

Another object is to provide a hydraulically operated quick release coupler for coupling a loading arm to a ship's manifold which utilizes minimum space to permit a plurality of arms to be simultaneously coupled to the same manifold.

Another object is to provide a hydraulically operated quick release coupler which is light in weight.

Other objects, features and advantages of the invention will be apparent from the drawings, the specification and the claims.

In the drawings, wherein an illustrative embodiment of this invention is shown, and wherein like numerals indicate like parts:

FIGURE 1 is a view in elevation showing a fragment of a loading arm and the preferred swivel assembly and hydraulic quick release coupler of this invention coupled to a ship's manifold flange as shown in dashed lines;

FIGURE 2 is a view along the lines 2—2 of FIGURE 1;

FIGURE 3 is a view on an enlarged scale along the lines 3—3 of FIGURE 1 with parts broken away to illustrate details and illustrating diagrammatically the control system;

FIGURE 4 is a fragmentary view in cross-section along the lines 4—4 of FIGURE 3;

FIGURE 5 is a line drawing illustrating the effect of different types of swivel assemblies with a common connector flange; and FIGURE 6 is an elevational view of one of the arms of the coupler.

The fragment 10 of the outboard arm of a loading arm may be of the type shown in the above identified Mowell and Sorensen patents and reference is made to these patents for a complete discussion of loading arms and the way in which the loading arm can be completely counterbalanced. This counterbalancing would be effected in a manner to counterbalance the load of the inboard and outboard arms plus the swivel assembly indicated generally at 11 and the quick release hydraulic coupler indicated generally at 12. However, there would be no counterbalancing of the fluid or fluidizable material in the arm and as discussed above this fluid or material exerts a load which for purposes of this disclosure may be considered to be concentrated at the first swivel attached to the end of the loading arm 10. Of course the material within the swivel asembly 11 and the coupler 12 will also exert an influence but the greatest force may be considered to be concentrated at the center of rotation of the swivel joint 13. Thus, as viewed in FIGURE 1, the position of the center of rotation of the swivel joint 13 controls the moment arm of the vertical load imposed on the ship's manifold indicated in dashed lines at 14. As this point is moved to the left as viewed in FIGURE 1, the moment arm is decreased. As it is moved to the right, the moment arm of the vertical component of the load on the arm is increased.

As three swivel joints 13, 15 and 16 provide for rotation in three mutually perpendicular planes, the center of gravity of the load depending from the loading arm will determine the position of the hook-up flange 17 relative to the loading arm. If the design is such that the center of gravity is to the left of a vertical plane passing through the center of rotation 13a of swivel 13, then the hook-up flange 17 will look downwardly. Correspondingly, if the center of gravity is to the right of axis 13a, then the hook-up flange 17 will look upwardly as viewed in FIGURE 1. If the hook-up flange looks down, then it will be facing the ship's manifold or facing away from the loading arm 10. If on the other hand the flange looks upwardly, then it will tend to cause the lower portion of the swivel system to rotate about swivel 15 so that the flange 17 looks away from the ship's manifold and back toward the loading arm. As the weights involved are very large, it will be appreciated that the hook-up flange 17 should preferably have its surface 18 which abuts the ship's manifold flange extend vertically or look down slightly, so that there will be no tendency for rotation about the swivel 15 and the force necessary to rotate the lower section of the system about the axis of swivel 15 will be relatively small.

From the above discussion it will be seen that movement of the swivel 13 of the swivel system and hook-up flange to the left of a vertical plane through point 13a gives the advantage of reducing the moment arm of the vertical component on the ship's manifold but results in the surface 18 tending to look upwardly and cause rotation about swivel 15 and out of register position with the ship's manifold 14. On the other hand, movement of the swivel 13 to the right of the point 13a has the disadvantage of increasing the moment arm and, if moved too far, also the disadvantage of causing the surface 18 to look downwardly at too great an angle. The center of gravity of the swivel and coupling system thus should be selected to position surface 18 vertical or looking downwardly a few degrees when the surface 18 is facing away from the loading arm. The swivel assembly design should position the swivel 13 as far toward the surface 18 as possible. Instead of counterweighting the swivel assembly as in the past, the system of this invention inserts the elbow section 19 into a conventional swivel system having three degrees of rotation in mutually perpendicular planes in its simplest form. The arc of elbow 19 is perpendicular to the arc of elbow 21. In other words, between swivels 13 and 15 there is normally provided the ninety degree elbow 21. Between swivels 15 and 16 there is normally provided the ninety degre elbow section 22. The swivel 13 is connected to a 90° elbow 8 which has a flange 9 adapted to be secured to the arm 10 as illustrated. Obviously if the elbow section 19 is removed and the swivel 15 attached directly to ninety degree elbow 21, then the center of gravity of the system will be moved to the left of the point 13a and the coupler will hang down to a substantial degree. Thus the elbow section 19 both provides a proper center of gravity for the system and moves the swivel 13 toward a point over the flange 17.

From the above it is apparent that by this invention the conventional swivel system is modified to insert the elbow section 19. This elbow section may be any number of degrees beginning at approximately ninety and reducing down to the number of degrees necessary to position the surface 18 in the desired manner. It will change with the size of the loading arm becuase a reduction in the size loading arm does not carry a corresponding or proportional reduction in the weight of the coupler 12. Thus, with the coupler illustrated, the size and degrees of the elbow section 19 in the preferred form will change between about sixty and seventy-five degrees. Of course, if a conventional bolt-type flange is used instead of the special coupler, the weight on the outboard end of the swivel system will be reduced and the elbow section 19 will be correspondingly reduced. It is obvious that the swivel system can be improved by the use of the elbow section 19 with both a standard bolt flange and with a quick release coupling. In fact, any desired type of coupling system may be used.

The packing in the several swivel joints normally presents considerable frictional resistance to rotation of the swivel joints and this will prevent rotation of the hydraulic coupler and elbow 22 about the swivel joint 15, but suitable stops may be provided on the swivel joint 15 to limit such rotation if desired.

In order to provide the three mutually perpendicular planes of rotation, it is apparent that the elbow sections 22 and 8 must be ninety degrees. The elbow section 21 is also preferably ninety degrees, but it obviously may be more or less than ninety degrees. As this elbow departs from ninety degrees, however, it tends to move the center of rotation of swivel 13 away from the ship's flange to increase the moment arm and therefore a ninety degree bend in elbow 21 is preferred. So long as a substantial bend is provided so that the three degrees of mutually perpendicular rotation can be obtained and the surface 18 can be positioned substantially vertically or slightly looking down by the use of the insert elbow 19, then a departure from ninety degrees in elbow 21 can be utilized. Obviously the size in degrees of arc of elbows 19 and 21 is interrelated and a reduction in the number of degrees provided in elbow 21 will require an increase in the number of degrees of elbow 19 to obtain the same effect.

From the above it is apparent that maximum benefit is obtained by fashioning elbow 21 at ninety degrees and selecting the size of elbow 19 to position the surface 18 as desired. However, it is apparent that by accepting the increased moment arm through which the uncounterbalanced weight of the fluid will be applied to the ship's manifold that the elbow 21 may be greater or less than ninety degrees.

The effect of different configurations of swivel joint systems utilizing a coupler of common weight and size is shown in FIGURE 5. A conventional system employing three 90° elbows between three swivels (omit elbow 19) is shown in dashed lines at 23. The system of FIGURE 1 is shown in solid lines at 24. Providing an insert section 19 of 90° is shown in dotted lines at 25. It will be noted that the system 23 which is conventional results in the coupler looking down at a substantial angle and thus for large size systems it is relatively difficult to flange up the system. Using the two 90° elbows, the hydraulic coupler tends to look up and will tend to cause rotation about swivel joint 15 and rotate the hydraulic coupler away from a position confronting the ship's flange. Once so rotated, it is also difficult to rotate the heavy system back to the desired position confronting the ship's flange. It might be pointed out however that if the weight of the coupler is sufficiently great, it may be necessary to employ an insert section 19 of 90°.

With the coupler and system shown, omission of insert elbow 19 moves the center of swivel to about point 23a. Increasing elbow 19 to a full 90° moves the center of swivel to about point 25a. Thus, use of a 90° insert 19 would be preferred to reduce the moment arm of the load on the ship's flange. Use of the smaller insert 19 is a compromise to obtain a reduction in moment arm from 23a to 13a and position the flange 17 in the desired orientation.

In the quick release coupler illustrated and preferred, the flange 17 provides the body of the coupler. The face 18 has a groove 26 therein in which a suitable seal such as O-ring 27 is provided to seal with a ship's flange. Preferably, a plurality of guides 28, 29 and 30 are provided to guide the surface 18 into contact with the ship's flange.

A plurality of arms 31, 32 and 33 are provided. Any number might be utilized, but three are preferred. Three pins 34, 35 and 36 are carried by the flange at equally spaced points thereabout, and the arms 31, 32 and 33 are carried on these pins 34, 35 and 36 respectively. As best shown in FIGURE 6, the arms each have a slot therein. This slot is angular in configuration. It has two straight sections 37a and 37b to provide an elbow in effect with the joint remote from the center of the flange. From FIGURE 1 it will be apparent that as the arms are moved to the left, the section 37a of the slot extends substantially coaxially with the center line of the coupler, and therefore the jaw 33a will move axially of the coupling to a point remote from the ship's flange. Upon the section 37b of the slot passing over the pin, the jaw will continue to move axially but will also move radially outwardly to a point at which the diameter of the circle defined by the innermost edge of the three jaws will be greater than the diameter of the ship's flange.

In order to reciprocate the several jaws simultaneously and yet permit them to move different distances to accommodate manufacturing tolerance in the ship's flange, while at the same time maintaining the overall diameter of the coupler at a minimum so that it may be used with closely spaced ship's flanges, a pair of hydraulic actuators is provided for each jaw. Each of these actuators is identical and reference is made to FIGURE 4 which illustrates their construction.

The side of the body or flange 17 remote from the face 18 has formed therein spaced bores 37 which open to the left side of the flange 17 as viewed in FIGURE 4. A cylinder sleeve 38 is positioned in the bore and a seal 39 seals therebetween. A head 41 is secured to the flange 17 by a plurality of bolts 42 and holds the cylinder head in position. A seal 43 is provided between the head 41 and a cylinder sleeve 38. A suitable piston 44 having a seal 45 is mounted for reciprocation within cylinder 38. A suitable sliding seal is provided by packing 46 between the connecting rod 47 carried by the piston 44 and the cylinder head 41.

As mentioned above, a pair of hydraulic actuators provided by the piston and cylinder just described are positioned one on each side of each arm. A wrist pin 48 extends between a pair of connecting rods and through the boss 49 on each arm to connect the hydraulic actuator to its associated arm.

The piston 44 is double acting. To minimize the possibility of trouble with the hydraulic system, the manifolding is provided internally to the maximum extent possible. Within the flange 17 there is provided an annular gathering ring 51 and a second annular gathering ring 52. These rings are machined into the flange 17 through face 18, and ring 52 communicates with the bore 37. After the rings have been machined, face 18 is completed by welding in place a filler which closes the grooves to the exterior. This is provided by welding two rings of metal 53 and 54 in place as shown in FIGURE 4.

Communication between the gathering ring 51 and the remote side of piston 44 is provided by a metal pipe 55 which extends between the flange 17 and head 41 and communicates with port 56 which leads into the gathering ring 51 and port 57 in the head. Suitable seals 58 and 59 are provided at each end of tube 55. The port 57 communicates with the interior of head 41 on the side of piston 44 remote from the flange.

Flexible hoses are connected to the gathering rings 51 and 52 at connections 61 and 62. (FIG. 3). These flexible hoses 63 and 64 communicate with a four-way valve 65 which, in turn, communicates with a pump 66 and a reservoir 67. By suitably positioning the fourway valve 65, the pump 66 supplies fluid to one side of piston 44 and fluid on the other side of the piston is returned through the four-way valve to the reservoir 67. Thus, simple action of the four-way valve advances the pistons to clamp the flange 17 to a ship's flange and upon reversal of the four-way valve retracts the pistons to release the flange 17 from the ship's flange. As the system is hydraulic and uses a common manifold system, it will be appreciated that the pistons will move substantially in unison to minimize galling of the crosshead provided by the wrist pin 48. The hydraulic system will also permit the arms being moved different distances to clamp a ship's flange which is not of the same thickness about its entire periphery.

The foregoing disclosure and description of the invention is illustrative and explanatory thereof and various changes in the size, shape and materials, as well as in the details of the illustrated construction, may be made without departing from the spirit of the invention.

What is claimed is:

1. A swivel assembly and connector means comprising,
   a first elbow of 90 degrees adapted to be connected at one end to the outboard end of a loading arm,
   a first swivel joint on the other end of the first elbow,
   a second elbow connected to the first swivel joint,
   a third elbow,
   a second swivel joint connected to the third elbow,
   said second and third elbows connected together with their arcs lying in perpendicular planes to provide for rotation of said second swivel joint in a plane perpendicular to the plane of rotation of the first swivel joint,
   a fourth elbow of 90 degrees connected to the second swivel joint,
   a third swivel joint connected to the fourth elbow and arranged for rotation in a plane perpendicular to the plane of rotation of the first and second swivel joints,
   and connector means carried on the third swivel joint and having an annular surface adapted to abut and be sealed to a flange of a fluid handling manifold,
   the size in degrees of said second and third elbows selected to position said annular surface in a vertical plane or looking down slightly when the assembly is suspended from a loading arm and said surface is facing away from the loading arm.

2. A swivel assembly and connector means comprising,
   a first elbow of 90 degrees adapted to be connected at one end to the outboard end of a loading arm,
   a first swivel joint on the other end of the first elbow,
   a second elbow of approximately 90 degrees connected to the first swivel joint,
   a third elbow of approximately 90 degrees or less connected to the second elbow,
   a second swivel joint connected to the third elbow,
   said second and third elbows connected together with their arcs lying in perpendicular planes to provide for rotation of said second swivel joint in a plane perpendicular to the plane of rotation of the first swivel joint,
   a fourth elbow of 90 degrees connected to the second swivel joint,
   a third swivel joint connected to the fourth elbow and arranged for rotation in a plane perpendicular to the plane of rotation of the first and second swivel joints, and connector means carried on the third swivel joint and having an annular surface adapted to abut and be sealed to a flange of a fluid handling manifold, the size in degrees of said second and third elbows selected to position said annular surface in a vertical plane or looking down slightly when the assembly is suspended from a loading arm and said surface is facing away from the loading arm.

3. The swivel assembly and connector means of claim 2 wherein the third elbow is sized to extend between 60 and 75 degrees.

4. The swivel assembly and connector means of claim 2 wherein the connector means includes a body having an annular flange carrying said annular surface, a plurality of arms each having a jaw on one end adapted to engage the back side of a manifold flange and pull said annular surface into engagement therewith, said arms arranged circumferentially about said flange, an angled slot in each arm, pins carried by said flange and extending through the slots in the arms and causing the jaw ends of the arms to first move radially of the body and then longitudinally of the body when the other ends of the arms are moved in a direction to move the jaws toward said surface, a pair of cylinders for each arm carried by the body on the side opposite said surface, pistons in each cylinder having connecting rods thereon, wrist pins connecting each arm between a pair of connecting rods and hydraulic means for simultaneously reciprocating said pistons to couple and release the connector means from a manifold flange.

5. A quick release coupler for coupling a loading arm to a manifold comprising, an annular flange sealingly connected to a hollow body member and said flange having a surface adapted to sealingly abut a fluid loading manifold flange, said hollow body adapted to be sealingly connected to a loading arm, a plurality of arms each having a jaw on one end adapted to engage the back side of a manifold flange and pull said surface into engagement therewith, said arms arranged circumferentially about said flange, an angled slot in each arm, pins carried by said flange and extending through the slots in the arms and causing the jaw ends of the arms to first move radially of said body and then longitudinally of said body when the other ends of the arms are moved in a direction to move said jaws toward said surface, a pair of cylinders for each arm carried by the body on the side opposite said surface, pistons in each cylinder having connecting rods thereon, wrist pins connecting each arm between a pair of connecting rods and hydraulic means for simultaneously reciprocating said pistons to couple and release the connector means from a manifold flange, said body provided with an internal manifold system for said hydraulic means.

References Cited

UNITED STATES PATENTS

| | | | |
|---|---|---|---|
| 1,478,925 | 12/1923 | Steed | 137—615 |
| 1,875,486 | 9/1932 | Peaslee | 51—238 |
| 1,910,706 | 5/1933 | Malzard | 285—320 |
| 1,938,829 | 12/1933 | Hamer | 285—276 X |
| 2,927,607 | 3/1960 | Bily | 137—615 |
| 3,050,092 | 8/1962 | Palcanis et al. | 141—387 |
| 3,073,343 | 1/1963 | Mowell et al. | 141—387 X |

FOREIGN PATENTS

| | | |
|---|---|---|
| 1,475,341 | 2/1967 | France. |
| 854,763 | 11/1960 | Great Britain. |

DAVID J. WILLIAMOWSKY, Primary Examiner

D. W. AROLA, Assistant Examiner

U.S. Cl. X.R.

137—561; 141—387; 285—181, 364, 420